United States Patent
Sakurai et al.

(10) Patent No.: US 10,261,735 B2
(45) Date of Patent: Apr. 16, 2019

(54) METHOD OF ESTIMATING AMOUNT OF INK CONSUMED, APPARATUS FOR ESTIMATING AMOUNT OF INK CONSUMED, AND PRINTING SYSTEM

(71) Applicant: SCREEN HOLDINGS CO., LTD., Kyoto (JP)

(72) Inventors: Ryoko Sakurai, Kyoto (JP); Shigenori Arizono, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/659,397

(22) Filed: Jul. 25, 2017

(65) Prior Publication Data

US 2018/0032293 A1   Feb. 1, 2018

(30) Foreign Application Priority Data

Jul. 27, 2016   (JP) .................................. 2016-147200

(51) Int. Cl.

| | |
|---|---|
| *G06F 3/12* | (2006.01) |
| *B41J 29/38* | (2006.01) |
| *B41J 29/46* | (2006.01) |
| *B41J 2/175* | (2006.01) |
| *H04N 1/00* | (2006.01) |
| *H04N 1/60* | (2006.01) |

(52) U.S. Cl.
CPC ............ *G06F 3/1239* (2013.01); *B41J 2/175* (2013.01); *B41J 2/17566* (2013.01); *B41J 29/38* (2013.01); *B41J 29/46* (2013.01); *H04N 1/00832* (2013.01); *H04N 1/60* (2013.01); *B41J 2002/17569* (2013.01); *G06F 3/12* (2013.01)

(58) Field of Classification Search
CPC ..... B41J 2/17566; B41J 2/195; G06F 3/1239; H04N 1/60
See application file for complete search history.

(56) References Cited

U.S. PATENT DOCUMENTS

| | | | | |
|---|---|---|---|---|
| 4,672,432 A | * | 6/1987 | Sakurada ........... | H04N 1/40087 347/43 |
| 4,926,251 A | * | 5/1990 | Sekizawa ........... | H04N 1/19505 358/535 |
| 6,086,193 A | * | 7/2000 | Shimada .............. | B41J 2/17503 347/86 |
| 7,283,258 B1 | | 10/2007 | Kuno et al. | |

(Continued)

FOREIGN PATENT DOCUMENTS

| | | |
|---|---|---|
| EP | 0 956 964 A2 | 11/1999 |
| EP | 1 249 349 A1 | 10/2002 |

(Continued)

*Primary Examiner* — John Zimmermann
(74) *Attorney, Agent, or Firm* — McDermott Will & Emery LLP

(57) ABSTRACT

After obtaining a print job (step S10), adjustment data is obtained based on job information included in the print job (step S20). After determining an estimation range (step S30), image data to be printed is corrected using the adjustment data (step S40). Then, an amount of ink which is predicted to be consumed by printing of an image represented by the corrected image data is calculated (step S50). Furthermore, when flushing is performed, an amount of ink which is predicted to be consumed by flushing is calculated (step S70).

20 Claims, 14 Drawing Sheets

(56) References Cited

U.S. PATENT DOCUMENTS

| | | | |
|---|---|---|---|
| 7,393,092 B2 * | 7/2008 | Saruta | B41J 2/17513 |
| | | | 347/7 |
| 9,083,911 B2 * | 7/2015 | Nomura | H04N 1/00015 |
| 2003/0146945 A1 | 8/2003 | Inui et al. | |
| 2004/0109035 A1 | 6/2004 | Otokita et al. | |
| 2008/0278530 A1 | 11/2008 | Tanaka et al. | |
| 2013/0128286 A1 * | 5/2013 | Tamagawa | G06K 15/02 |
| | | | 358/1.2 |

FOREIGN PATENT DOCUMENTS

| | | |
|---|---|---|
| EP | 1 285 764 A1 | 2/2003 |
| JP | 2000-071582 A | 3/2000 |
| JP | 2007-265419 | 10/2007 |

* cited by examiner

| TYPE OF BASE MATERIAL | PRINTING SPEED | TABLE SET USED IN IMAGE DATA CORRECTION PROCESS |
|---|---|---|
| PLAIN PAPER | HIGH SPEED | FIRST TABLE SET |
| PLAIN PAPER | LOW SPEED | SECOND TABLE SET |
| COATED PAPER | HIGH SPEED | THIRD TABLE SET |
| COATED PAPER | LOW SPEED | FOURTH TABLE SET |
| TRANSPARENCY FILM | HIGH SPEED | FIFTH TABLE SET |
| TRANSPARENCY FILM | LOW SPEED | SIXTH TABLE SET |

METHOD OF ESTIMATING AMOUNT OF INK CONSUMED, APPARATUS FOR ESTIMATING AMOUNT OF INK CONSUMED, AND PRINTING SYSTEM

BACKGROUND OF THE INVENTION

Field of the Invention

The present invention relates to a method of estimating the amount of ink consumed when an inkjet printing apparatus performs printing.

Description of Related Art

Conventionally, there is known an inkjet printing apparatus that performs printing by discharging ink onto a base material (printing paper, etc.) by heat or pressure. If the inkjet printing apparatus runs out of ink in the middle of performing printing, then desired printed matter cannot be obtained, resulting in a great waste of ink, a base material, etc. Hence, there is also developed an inkjet printing apparatus having the function of performing a process of pre-estimating the amount of ink consumed when printing is performed (hereinafter, referred to as an "amount-of-ink-consumed estimation process"). According to such an inkjet printing apparatus, when it is predicted that ink runs out, a user can refill ink in advance, and thus, the occurrence of a waste of ink, a base material, etc., is suppressed. In addition, the above-described function may also be used to pre-estimate cost required for printing.

Inventions related to an amount-of-ink-consumed estimation process such as that described above are disclosed in, for example, Japanese Laid-Open Patent Publication Nos. 2000-71582 and 2007-265419. Printing systems disclosed in Japanese Laid-Open Patent Publication Nos. 2000-71582 and 2007-265419 predict the amount of ink consumed, using preview data which is generated based on data (image data) to be printed which is subjected to a RIP process. At that time, by averaging the gradations of respective pixels of an image based on the preview data, the time required to predict the amount of ink consumed is reduced.

Meanwhile, even when printing is performed using the same image data, the amount of ink actually consumed changes depending on, for example, the tone and printing speed specified by a user and the type of base material used upon printing. For example, an inkjet printing apparatus (hereinafter, also simply referred to as an "apparatus") performs a process called a "shading process" that adjusts the amount of ink discharged from each nozzle in order to suppress the occurrence of density variation. The amount of ink to be adjusted in the shading process is determined by the type of base material and a printing mode (e.g., printing speed and resolution). That is, the amount of ink adjusted in the shading process varies depending on the type of base material and printing mode. In addition, the amount of ink adjusted varies with individual apparatuses that are actually used for printing. Furthermore, as for processes other than the shading process, too, the amount of ink may be adjusted for each apparatus. Note that, in this specification, various data for adjusting, for each apparatus used for printing, the amount of ink discharged when printing is performed is collectively referred to as "adjustment data".

As described above, even when printing is performed using the same image data, the amount of ink actually consumed changes with the results of adjustment performed using adjustment data. However, conventionally, the amount of ink consumed is estimated (predicted) without taking into account such adjustment data. Hence, estimation of the amount of ink consumed is not performed with sufficient accuracy. Therefore, a user who wants highly accurate estimation results, for example, actually prints a small number of copies and estimates the amount of ink consumed for the entire print job from the amount of ink consumed when the small number of copies are printed. Due to the above circumstances, there is a strong demand for an improvement in the accuracy of estimation of the amount of ink consumed.

SUMMARY OF THE INVENTION

An object of the present invention is therefore to provide a method of estimating the amount of ink consumed when an inkjet printing apparatus performs printing, with higher accuracy than conventional cases.

To attain the above-described object, the present invention has features shown below.

One aspect of the present invention is directed to a method of estimating an amount of ink consumed when an inkjet printing apparatus performs printing, the method including:

a print job obtaining step of obtaining a print job including image data to be printed and job information, the job information being attribute information about printing;

an adjustment data obtaining step of obtaining adjustment data according to the job information, the adjustment data being for adjusting, for each inkjet printing apparatus used for printing, an amount of ink discharged when printing is performed;

an image data correcting step of correcting the image data using the adjustment data; and an amount-of-ink-consumed calculating step of calculating, as an amount of ink consumed, an amount of ink required to print an image represented by the image data corrected by the image data correcting step.

According to such a configuration, adjustment data which is data for adjusting, for each inkjet printing apparatus used for printing, the amount of ink discharged when printing is performed is obtained according to job information included in a print job, and image data to be printed is corrected using the adjustment data. Then, based on the corrected image data, the amount of ink required for printing is estimated. As such, the amount of ink consumed is estimated taking into account adjustment data obtained according to job information, based on which printing is actually performed. Therefore, the amount of ink consumed when the inkjet printing apparatus performs printing is estimated with higher accuracy than conventional cases. As a result, the occurrence of a waste of ink, a base material, etc., due to the ink running out in the middle of printing is suppressed. In addition, cost required for printing can be pre-estimated with sufficiently high accuracy.

Another aspect of the present invention is directed to an apparatus for estimating an amount of ink consumed when an inkjet printing apparatus performs printing, the apparatus including:

a print job obtaining unit configured to obtain a print job including image data to be printed and job information, the job information being attribute information about printing;

an adjustment data obtaining unit configured to obtain adjustment data according to the job information, the adjustment data being for adjusting, for each inkjet printing apparatus used for printing, an amount of ink discharged when printing is performed;

an image data correcting unit configured to correct the image data using the adjustment data; and an amount-of-ink-consumed calculating unit configured to calculate, as an amount of ink consumed, an amount of ink required to print an image represented by the image data corrected by the image data correcting unit.

A still another aspect of the present invention is directed to a printing system including an image data generating apparatus that generates image data to be printed; and an inkjet printing apparatus including a printer main body that performs printing by discharging ink onto a base material, and a print control apparatus that controls operation of the printer main body, the printing system including:

a print job obtaining unit configured to obtain a print job including the image data and job information, the job information being attribute information about printing;

an adjustment data obtaining unit configured to obtain adjustment data according to the job information from among a plurality of pieces of adjustment data generated by the inkjet printing apparatus to adjust an amount of ink discharged when printing is performed;

an image data correcting unit configured to correct the image data using the adjustment data obtained by the adjustment data obtaining unit; and an amount-of-ink-consumed calculating unit configured to calculate, as an amount of ink consumed, an amount of ink required to print an image represented by the image data corrected by the image data correcting unit.

These and other objects, features, modes, and effects of the present invention will be made clear from the following detailed description of the present invention with reference to the accompanying drawings.

DETAILED DESCRIPTION OF PREFERRED EMBODIMENTS

One embodiment of the present invention will be described below with reference to the accompanying drawings.

<1. Overall Configuration of a Printing System>

Figure 1:
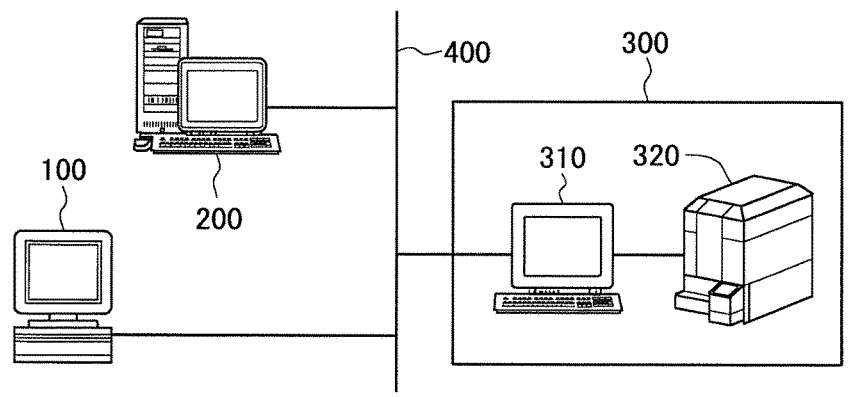
FIG. 1 is an overall configuration diagram of a printing system according to one embodiment of the present invention.

FIG. 1 is an overall configuration diagram of a printing system according to one embodiment in the present invention. The printing system includes a client computer 100 for performing an editing process using characters that form printed matter and a plurality of types of elements such as logos, patterns, and illustrations that form printed matter; an image data generating apparatus 200 that generates image data by performing data processing, such as a RIP process (rasterizing process), on submitted data; and an inkjet printing apparatus 300 that performs color printing. The inkjet printing apparatus 300 includes a printer main body 320 and a print control apparatus 310 which is a control apparatus for the printer main body 320. The client computer 100, the image data generating apparatus 200, and the inkjet printing apparatus 300 are connected to each other by a communication line 400 so that they can communicate with each other.

Note that the inkjet printing apparatus 300 in the present embodiment is a photocurable (UV-curable) inkjet printing apparatus. Note, however, that the present invention can also be applied to other inkjet printing apparatuses (e.g., an inkjet printing apparatus that performs printing using water-based inks) than a photocurable inkjet printing apparatus.

Printing by this printing system is roughly performed as follows. First, in the client computer 100, for example, page data in which a print target is described in a page description language is generated by performing editing and layout of various types of elements. The page data generated by the client computer 100 is provided, as submitted data, to the image data generating apparatus 200. The image data generating apparatus 200 performs data processing, such as a RIP process, on the submitted data. By this, image data in bitmap format which is printing data is generated. The image data generated by the image data generating apparatus 200 is sent to the inkjet printing apparatus 300. Then, the inkjet printing apparatus 300 performs printing based on the image data.

Note that in the following description it is assumed that TIFF (Tagged Image File Format) data for each plate is sent to the inkjet printing apparatus 300 from the image data generating apparatus 200, as image data to be printed. Note, however, that the present invention is not limited thereto, and image data to be printed may be data other than TIFF data.

<2. Configuration of the Inkjet Printing Apparatus>

Figure 2:
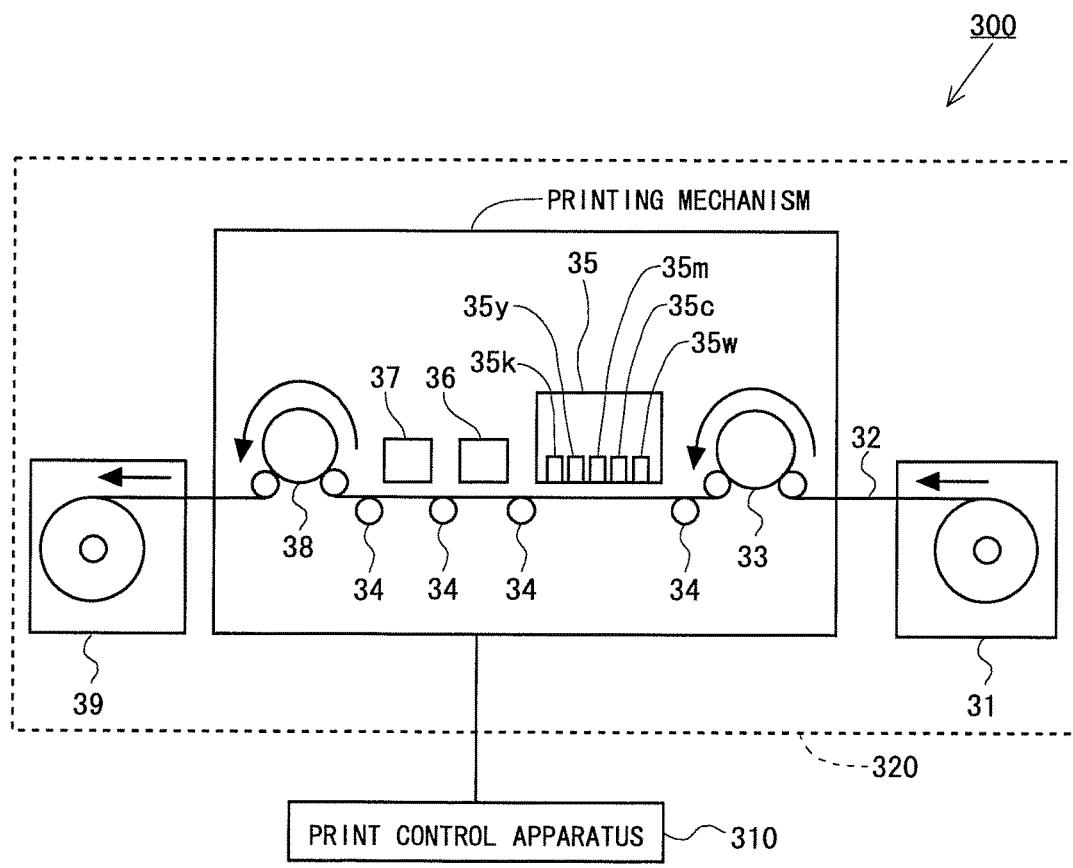
FIG. 2 is a schematic diagram showing an exemplary configuration of an inkjet printing apparatus in the embodiment.

FIG. 2 is a schematic diagram showing an exemplary configuration of the inkjet printing apparatus 300 in the present embodiment. As described above, the inkjet printing apparatus 300 includes the printer main body 320 and the print control apparatus 310 which is a control apparatus for the printer main body 320.

The printer main body 320 includes a roll-out unit 31 that supplies a base material 32 such as printing paper; a first drive roller 33 for transporting the base material 32 into a printing mechanism; a plurality of support rollers 34 for transporting the base material 32 within the printing mechanism; a print unit 35 that performs printing by discharging ink onto the base material 32; a UV irradiating unit 36 that cures the ink on the printed base material 32; a checking unit 37 that checks the state of print on the base material 32; a second drive roller 38 for outputting the base material 32 from within the printing mechanism; and a roll-up unit 39 that rolls up the printed base material 32.

The print unit 35 includes a W inkjet head 35$w$, a C inkjet head 35$c$, an M inkjet head 35$m$, a Y inkjet head 35$y$, and a K inkjet head 35$k$ that discharge W (white), C (cyan), M (magenta), Y (yellow), and K (black) inks, respectively. Each of the inkjet heads 35$w$, 35$c$, 35$m$, 35$y$, and 35$k$ has multiple nozzles that discharge ink by the drive of piezoelectric elements. Ink is discharged from each nozzle by providing a voltage of a waveform determined according to an aimed amount of ink droplets to a piezoelectric element. Note that in the printing mechanism there are also provided ink tanks (not shown) that store inks to be supplied to the respective inkjet heads 35$w$, 35$c$, 35$m$, 35$y$, and 35$k$.

The print control apparatus 310 controls the operation of the printer main body 320 configured in the above-described manner. When a command instructing to perform printout is provided to the print control apparatus 310, the print control apparatus 310 controls the operation of the printer main body 320 such that the base material 32 is transported from the roll-out unit 31 to the roll-up unit 39. Then, in the process of transporting the base material 32, first, print is performed by the discharge of inks from the respective inkjet heads 35$w$, 35$c$, 35$m$, 35$y$, and 35$k$ in the print unit 35, and then the UV irradiating unit 36 cures the inks, and finally the checking unit 37 checks the state of print.

In addition, in the present embodiment, when a command instructing to estimate the amount of ink consumed when the inkjet printing apparatus 300 performs printing is provided to the print control apparatus 310 by an operator (user), the print control apparatus 310 estimates the amount of ink consumed as will be described later, taking into account the above-described adjustment data. That is, in the present embodiment, an apparatus for estimating the amount of ink consumed is implemented by the print control apparatus 310.

Figure 3:
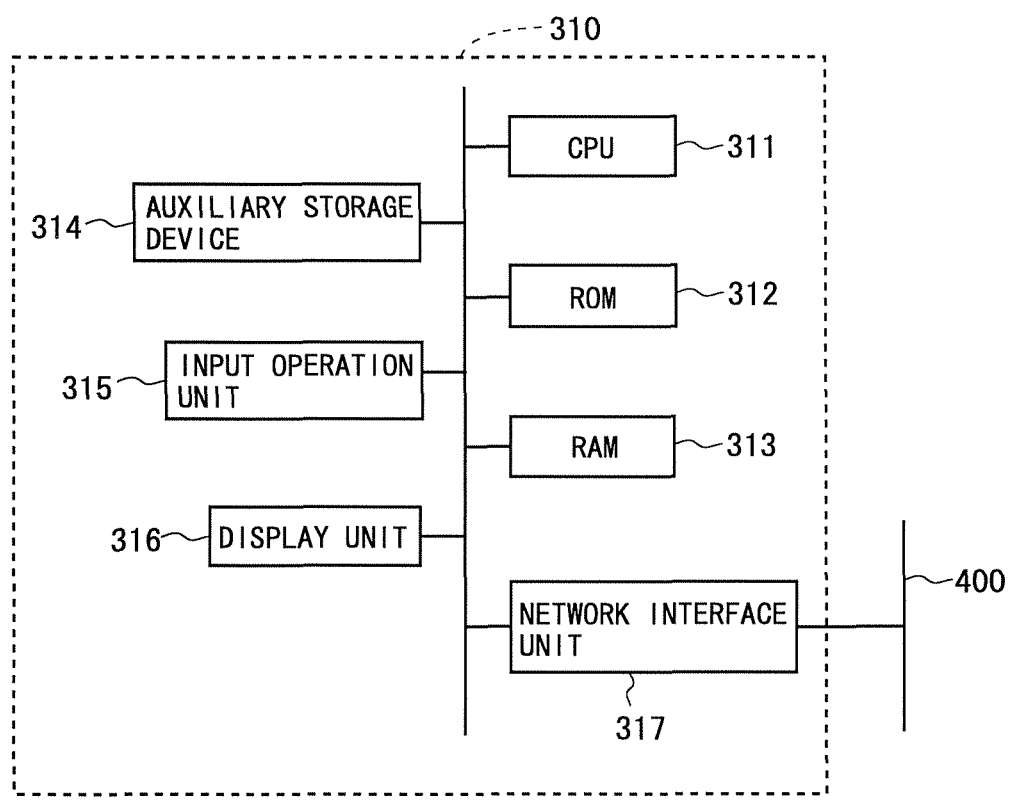
FIG. 3 is a hardware configuration diagram of a print control apparatus in the embodiment.

FIG. 3 is a hardware configuration diagram of the print control apparatus 310 in the present embodiment. The print control apparatus 310 includes a CPU 311, a ROM 312, a RAM 313, an auxiliary storage device 314, an input operation unit 315 such as a keyboard, a display unit 316, and a network interface unit 317. Image data which is sent from the image data generating apparatus 200 via the communication line 400 is inputted into the print control apparatus 310 through the network interface unit 317. A program for performing an amount-of-ink-consumed estimation process (hereinafter, referred to as an "amount-of-ink-consumed estimation program") is stored in the auxiliary storage device 314. When an instruction to perform an amount-of-ink-consumed estimation process is provided, the amount-of-ink-consumed estimation program is read into the RAM 313 from the auxiliary storage device 314, and the CPU 311 executes the amount-of-ink-consumed estimation program read into the RAM 313, by which estimation of the amount of ink consumed is performed.

Figure 4:
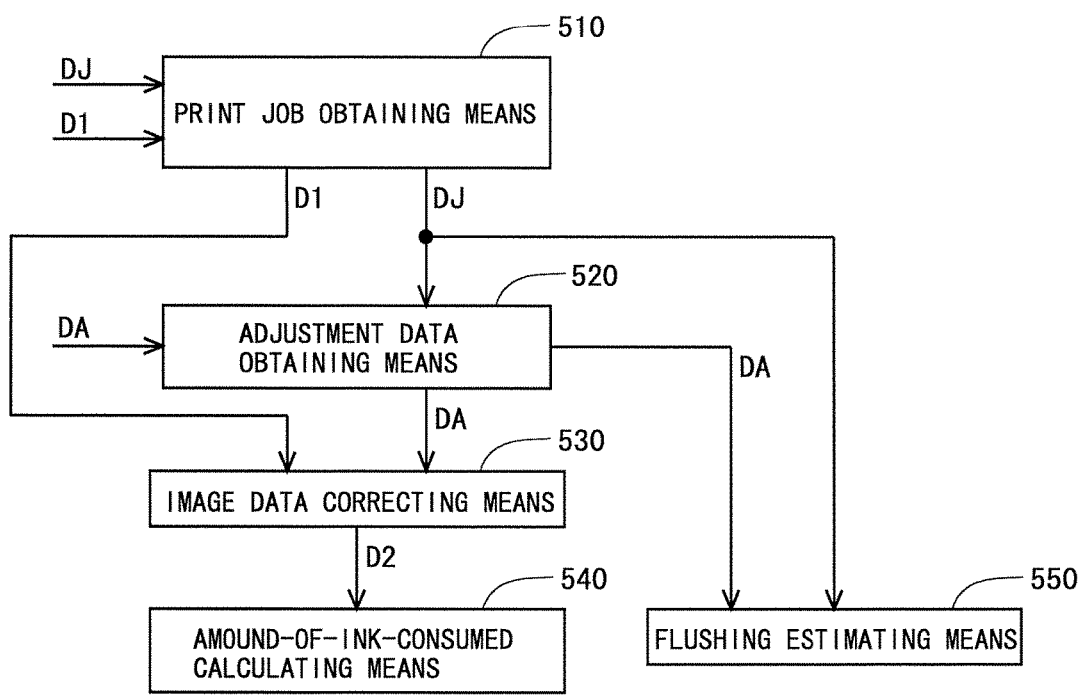
FIG. 4 is a functional block diagram showing the configuration of functions implemented by the print control apparatus in the embodiment.

FIG. 4 is a functional block diagram showing the configuration of functions which are implemented by the print control apparatus 310 by executing the amount-of-ink-consumed estimation program. As shown in FIG. 4, the print control apparatus 310 is functionally provided with print job obtaining means 510, adjustment data obtaining means 520, image data correcting means 530, amount-of-ink-consumed calculating means 540, and flushing estimating means 550.

The print job obtaining means 510 obtains image data D1 and job information DJ which are included in a print job, on which estimation of the amount of ink consumed is performed. The adjustment data obtaining means 520 obtains the above-described adjustment data DA, according to the job information DJ. The image data correcting means 530 corrects the image data D1 using the adjustment data DA. The amount-of-ink-consumed calculating means 540 calculates the amount of ink required to print an image represented by image data D2 corrected by the image data correcting means 530. The flushing estimating means 550 calculates, based on the job information DJ, the amount of ink used by flushing when flushing is performed. Details of an amount-of-ink-consumed estimation process performed by these functional components will be described below.

<3. Amount-of-Ink-Consumed Estimation Process>

<3.1 Overview>

An amount-of-ink-consumed estimation process in the present embodiment will be described below. The amount-of-ink-consumed estimation process is, as described above, performed by the print control apparatus 310. Note, however, that the present invention can also be applied to a case in which the amount-of-ink-consumed estimation process is performed by an apparatus other than the print control apparatus 310. Before performing the amount-of-ink-consumed estimation process, a print job needs to be registered in advance. That is, when a print job is held in the auxiliary storage device 314, etc., in the print control apparatus 310, an amount-of-ink-consumed estimation process based on the print job can be performed. Meanwhile, the conventional amount-of-ink-consumed estimation process does not take into account the above-described adjustment data DA. On the other hand, in the present embodiment, the amount of ink consumed is estimated taking into account the adjustment data DA.

<3.2 Processing Procedure>

Figure 5:
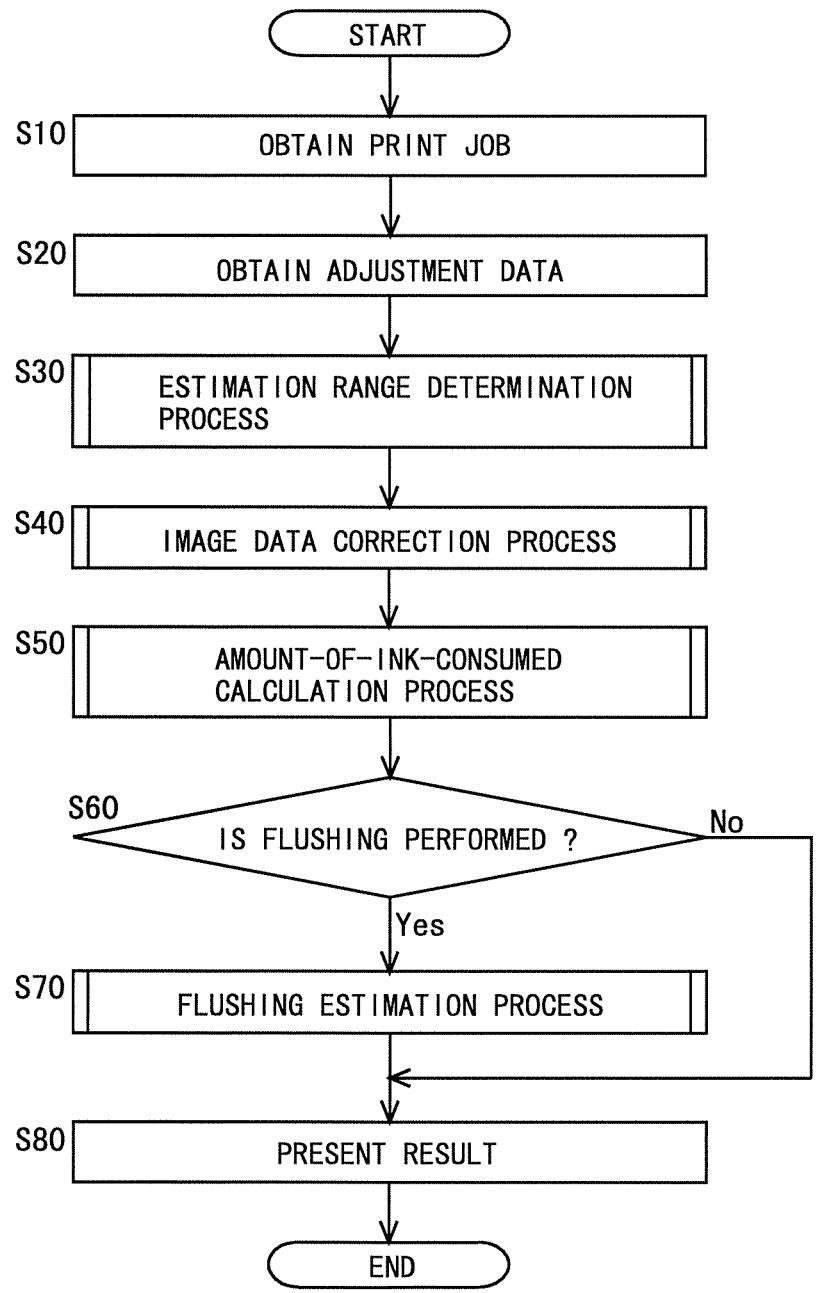
FIG. 5 is a flowchart showing a procedure of an amount-of-ink-consumed estimation process in the embodiment.

FIG. 5 is a flowchart showing a procedure of an amount-of-ink-consumed estimation process in the present embodiment. After the amount-of-ink-consumed estimation process starts, first, a print job is obtained (step S10). Specifically, in the print control apparatus 310, a print job held in the auxiliary storage device 314, etc., is read into the RAM 313.

The print job includes image data (TIFF data for each plate) D1 to be printed and job information DJ which is attribute information about printing. The job information DJ includes information on, for example, the type of base material, printing mode, tone, the width of a base material, page eject length, an offset, the number of copies, a print page range, and a flushing flag.

The type of base material is the type of base material used upon printing. Note that in the following, for convenience of description, it is assumed that any of "plain paper", "coated paper", and a "transparency film" can be selected as the type of base material. The printing mode refers to a printing scheme, e.g., printing speed and resolution. Note that in the following, for convenience of description, it is assumed that only the printing speed out of the printing mode affects the amount of ink consumed, and that either one of "high speed" and "low speed" can be selected as the printing speed.

Tone generally means the shade of color, but the information on tone included in the job information DJ is information indicating which one of a plurality of tone tables prepared is used upon printing. Here, the tone table refers to a lookup table in which correspondences between input gradation values and output gradation values are defined to adjust the tone (shade of color) of each color.

The width of a base material is the width of a base material used upon printing. In other words, the width of a base material is the length of a base material in a direction perpendicular to a direction in which the base material moves. The page eject length is the length of one page in the direction in which the base material moves. The offset is a value representing an amount by which a print start position is displaced from a predetermined reference position. The offset is represented by a distance from the reference position in an X-axis direction (the direction perpendicular to the direction in which the base material moves) and a distance from the reference position in a Y-axis direction (a direction opposite to the direction in which the base material moves).

The number of copies is a value representing how many times printing based on the image data D1 to be printed is repeated. The print page range is the range of pages on which printing is performed. The print page range is represented by a start page and an end page. The flushing flag is information indicating whether to perform flushing during printing. In the present embodiment, when the flushing flag is on (the value is "1"), flushing is performed during printing, and when the flushing flag is off (the value is "0"), flushing is not performed during printing.

After obtaining the print job, adjustment data DA is obtained based on the job information DJ, such as that described above, which is included in the print job (step S20). Note that, as described above, the "adjustment data" in this specification is a collective term for various data for adjusting, for each apparatus used for printing, the amount of ink discharged when printing is performed. In the present embodiment, the adjustment data DA includes, as data related to the amount of ink discharged, i.e., the amount of ink consumed, "color adjustment data" for adjusting the color of printed matter by adjusting the amount of ink discharged onto a base material; and "apparatus adjustment data" for performing printer's operational adjustment, such as adjustment of the conditions of inkjet heads, by discharging ink. In the present embodiment, as the "color adjustment data" out of the adjustment data DA, there are included tone adjustment data for adjusting the tone of each color; shading adjustment data for adjusting the amount of ink discharged from each nozzle; density adjustment data for adjusting the density of each color; and amount-of-droplet adjustment data for adjusting the amount of ink droplets discharged from a nozzle. In addition, as the "apparatus adjustment data", there is included flushing enable/disable data indicating whether flushing can be performed or not. At step S20, the adjustment data DA including the color adjustment data and the apparatus adjustment data is obtained.

Figure 6:
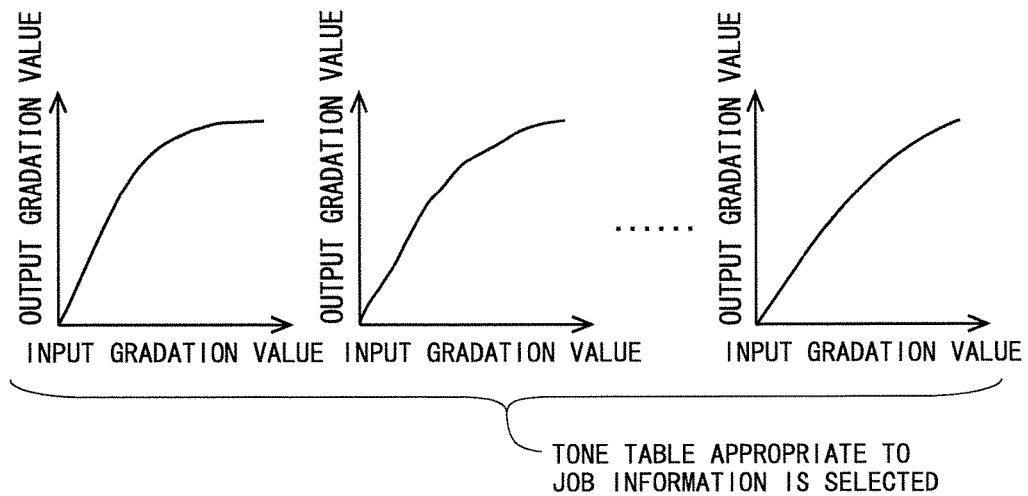
FIG. 6 is a diagram for describing obtaining of a tone table in the embodiment.

The tone adjustment data is realized by the above-described tone table. The tone table is schematically represented by a graph in which, for example, the horizontal and vertical axes are an input gradation value and an output gradation value, respectively. The print control apparatus 310 can register information on tone (correspondences between input gradation values and output gradation values). When the print control apparatus 310 registers information on tone, tone tables are created. The tone tables are stored in, for example, the auxiliary storage device 314 in the print control apparatus 310. In this manner, a plurality of tone tables are prepared for each color. At step S20, a tone table appropriate to the information on tone included in the job information DJ is obtained (selected) for each color from among the plurality of tone tables prepared (see FIG. 6).

Figure 7:
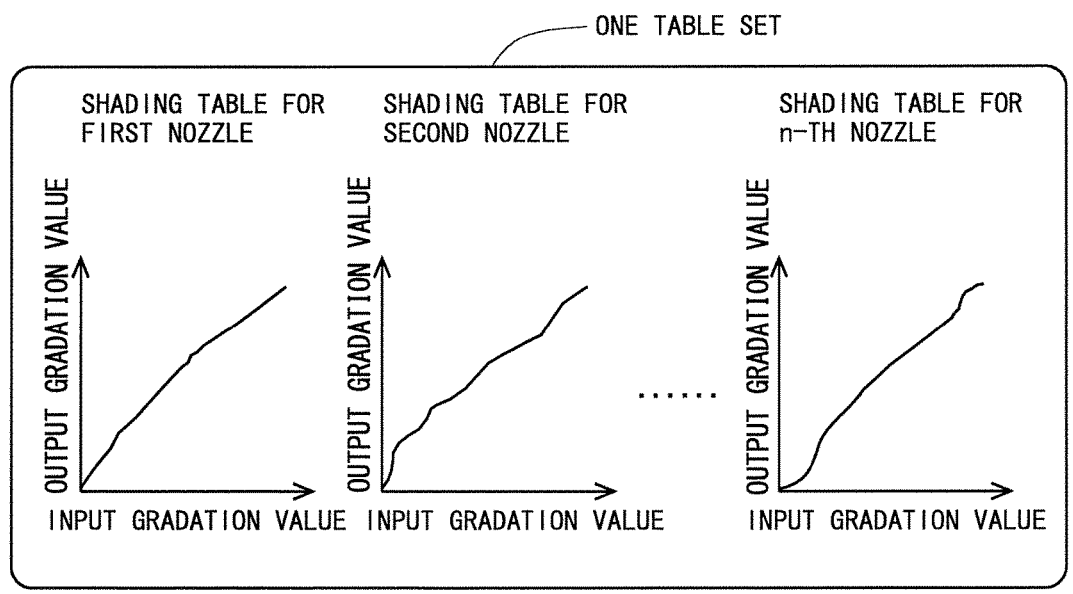
FIG. 7 is a diagram for describing a table set including a set of a plurality of shading tables in the embodiment.
Figures 8, 9:
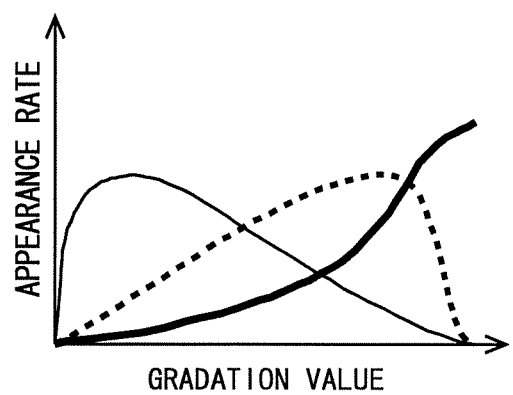
FIG. 8 is a diagram for describing obtaining of a table set (a set of a plurality of shading tables) in the embodiment.
FIG. 9 is a diagram for describing a halftone dot table in the embodiment.

The shading adjustment data is realized by a shading table in which input gradation values and output gradation values are associated with each other for each color and each nozzle to adjust the amount of ink discharged. As with the tone table, the shading table is also schematically represented by a graph in which, for example, the horizontal and vertical axes are an input gradation value and an output gradation value, respectively. Meanwhile, in the present embodiment, the amount of ink adjusted in a shading process is determined based on the type of base material and printing speed. In addition, as described above, the amount of ink discharged is adjusted for each nozzle. Therefore, when it is assumed that the inkjet head for each color is provided with n nozzles, for each color, one table set is formed by a set of n shading tables respectively corresponding to the n nozzles, as shown in FIG. 7. Such a table set is provided for each combination of the type of base material and printing speed. Then, for example, as shown in FIG. 8, correspondences between "combinations of the type of base material and printing speed" and "table sets used in an image data correction process which will be described later" are defined in advance. Under the presumption such as that described above, at step S20, a table set associated with a combination of the information on the type of base material included in the job information DJ and the information on printing speed out of the printing mode included in the job information DJ is obtained for each color. In the example shown in FIG. 8, if the type of base material is coated paper and the printing speed is high speed, then a third table set is obtained.

The density adjustment data is realized by a density table in which input gradation values and output gradation values are associated with each other for each color to adjust density. As with the tone table, the density table is also schematically represented by a graph in which, for example, the horizontal and vertical axes are an input gradation value and an output gradation value, respectively. The inkjet printing apparatus 300 in the present embodiment performs, as the processes of adjusting density, a process of adjusting solid density and a process of linearizing a halftone. One density table is created by merging a table for the process of adjusting solid density with a table for the process of linearizing a halftone. In the present embodiment, a plurality of density tables are prepared for each color, and adjustment of density is performed based on the type of base material and printing speed. Therefore, at step S20, a density table appropriate to a combination of the information on the type of base material included in the job information DJ and the information on printing speed out of the printing mode included in the job information DJ is obtained for each color.

The amount-of-droplet adjustment data is realized by a halftone dot table in which the appearance rate of each of a plurality of droplet sizes when ink is discharged from a nozzle is set for each gradation value; and waveform information of a voltage provided to a piezoelectric element when ink is discharged. In the inkjet printing apparatus 300 in the present embodiment, three-stage sizes (size L, size M, and size S) are provided as the dot size of discharged ink. Then, by the halftone dot table, the appearance rate of each of size L, size M, and size S is set for each gradation value. Therefore, the halftone dot table is schematically represented, as shown in FIG. 9, by a graph in which the horizontal and vertical axes are the gradation value and the appearance rate, respectively. Note that in FIG. 9 a thick solid line indicates a characteristic of size L, a thick dotted line indicates a characteristic of size M, and a thin solid line indicates a characteristic of size S. In the present embodiment, a plurality of such halftone dot tables are prepared in advance, and a halftone dot table to be used upon printing is determined based on a combination of the type of base material and printing speed. In addition, the amount of droplets corresponding to each size is determined by the waveform of a voltage provided to a piezoelectric element. Therefore, the print control apparatus 310 holds that waveform information. In the present embodiment, a plurality of pieces of such waveform information are prepared in advance for each size, and the waveform of a voltage actually provided to a piezoelectric element upon printing is determined based on a combination of the type of base material and printing speed. Under the presumption such as that described above, at step S20, a halftone dot table and waveform information that are appropriate to a combination of the information on the type of base material included in the job information DJ and the information on printing speed out of the printing mode included in the job information DJ are obtained. Note that the present invention can also be applied to a case in which only one halftone dot table is prepared, and to a case in which only one piece of waveform information is prepared for each size.

Note that the shading tables, the density tables, and the halftone dot tables are also stored in the auxiliary storage device 314 in the print control apparatus 310, which is the same as for the tone tables.

The flushing enable/disable data is data indicating whether flushing can be performed or not. In the present embodiment, the flushing flag included in the job information DJ serves as flushing enable/disable data as it is. Note that the amount of ink discharged by one flushing is set in advance on the print control apparatus 310 and is stored in the auxiliary storage device 314.

After obtaining the adjustment data DA such as that described above, an estimation range determination process is performed (step S30). The estimation range determination process is a process of determining a print range of an image based on the print job, and nozzles to be used when printing is performed. Thereafter, an image data correction process is performed (step S40). The image data correction process is a process of correcting the image data (the image data D1 to be printed which is included in the print job), using the tone adjustment data, shading adjustment data, and density adjustment data out of the adjustment data DA which is obtained at step S20. Thereafter, an amount-of-ink-consumed calculation process is performed (step S50). The amount-of-ink-consumed calculation process is a process of determining the amount of ink consumed by printing of an image represented by corrected image data D2.

Thereafter, it is determined whether to perform flushing, based on the flushing enable/disable data (step S60). In the present embodiment, specifically, it is determined whether the flushing flag is on or off. If, as a result of the determination, the flushing flag is on, then flushing is performed upon printing and thus processing proceeds to step S70. On the other hand, if the flushing flag is off, then flushing is not performed upon printing and thus processing proceeds to step S80.

At step S70, a flushing estimation process is performed. The flushing estimation process is a process of estimating the amount of ink used by performing flushing. Note that in the flushing estimation process, as will be described later, a total amount of ink consumed is determined by adding the amount of ink used for the printing of the image (the amount of ink consumed which is calculated at step S50) to the amount of ink used for flushing. After step S70 ends, processing proceeds to step S80.

At step S80, a result (the estimation value of the amount of ink consumed when printing based on the image data to be printed is performed) is presented on, for example, the display unit 316 in the print control apparatus 310. Note that when flushing is performed, the total amount of ink consumed which is obtained in the flushing estimation process (step S70) is presented as the estimation value to a user. On the other hand, when flushing is not performed, the amount of ink consumed which is determined in the above-described amount-of-ink-consumed calculation process (step S50) is presented as the estimation value to the user.

Note that in the present embodiment a print job obtaining step is implemented by the above-described step S10, an adjustment data obtaining step is implemented by the above-described step S20, an image data correcting step is implemented by the above-described step S40, an amount-of-ink-consumed calculating step is implemented by the above-described step S50, a flushing determining step is implemented by the above-described step S60, and a flushing estimating step is implemented by the above-described step S70.

The estimation range determination process (step S30), the image data correction process (step S40), the amount-of-ink-consumed calculation process (step S50), and the flushing estimation process (step S70) will be described in detail below.

<3.2.1 Estimation Range Determination Process>

Figure 10:
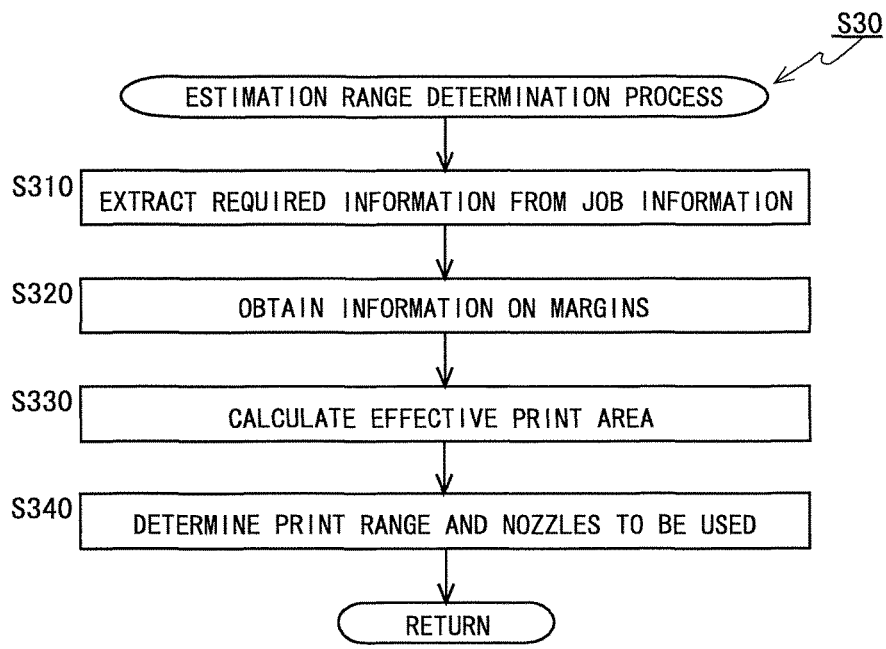
FIG. 10 is a flowchart showing a detailed procedure of an estimation range determination process in the embodiment.

FIG. 10 is a flowchart showing a detailed procedure of the estimation range determination process. After the estimation range determination process starts, first, information required for this estimation range determination process is extracted from the job information DJ obtained at step S10 (see FIG. 5) (step S310). In the present embodiment, the information on the width of a base material, page eject length, and an offset is extracted from the job information DJ. Note that at step S330 and S340 which will be described later, TIFF data for each plate is also used. Then, information on margins used when printing is performed is obtained (step S320). The size of margins is set for each model of an inkjet printing apparatus.

Figure 11:
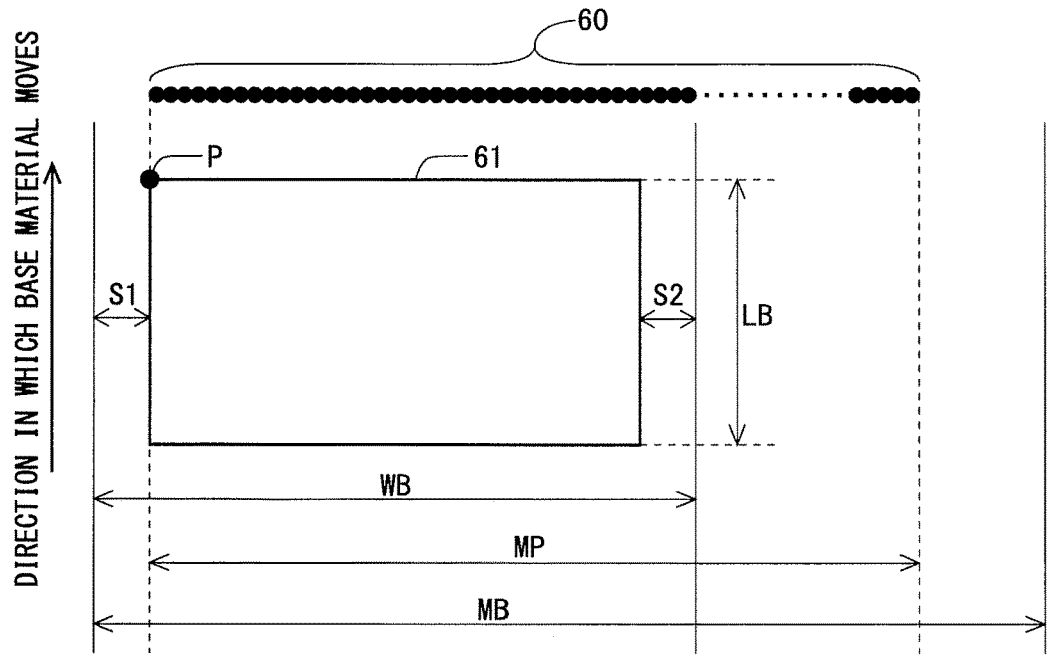
FIG. 11 is a diagram for describing calculation of an effective print area in the embodiment.

Thereafter, an effective print area is calculated (step S330). The effective print area is a printable area which is determined taking into account the width of a base material, page eject length, and margins. When the width of the base material is represented by reference sign WE, the page eject length is represented by reference sign LB, the margin at the left of the page is represented by reference sign S1, the margin at the right of the page is represented by reference sign S2, and the reference position is represented by reference sign P, a rectangular range represented by reference sign 61 in FIG. 11 is an effective print area. Note that in FIG. 11 nozzles are represented by reference sign 60, the maximum print width is represented by reference sign MP, and the maximum width of a base material that can be used in the inkjet printing apparatus 300 is represented by reference sign MB. As an example, the maximum width of a base material is 350 mm, the maximum print width is 322 mm, and the left and right margins S1 and S2 are 4 mm.

Figure 12:
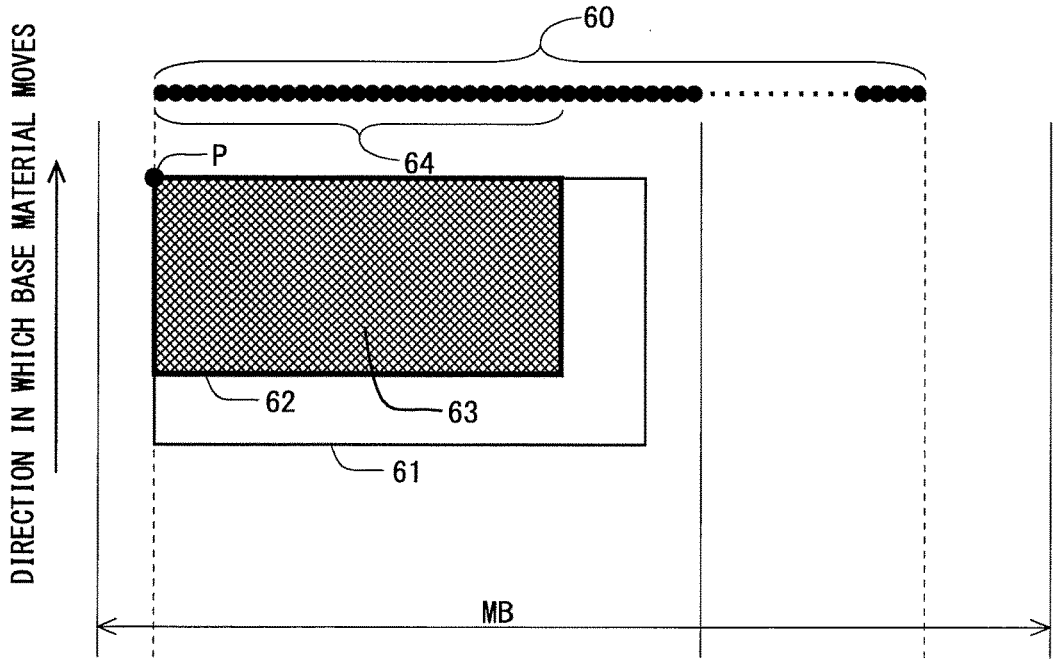
FIG. 12 is a diagram for describing determination of a print range and nozzles to be used for a case in which an offset is not provided in the embodiment.
Figure 13:
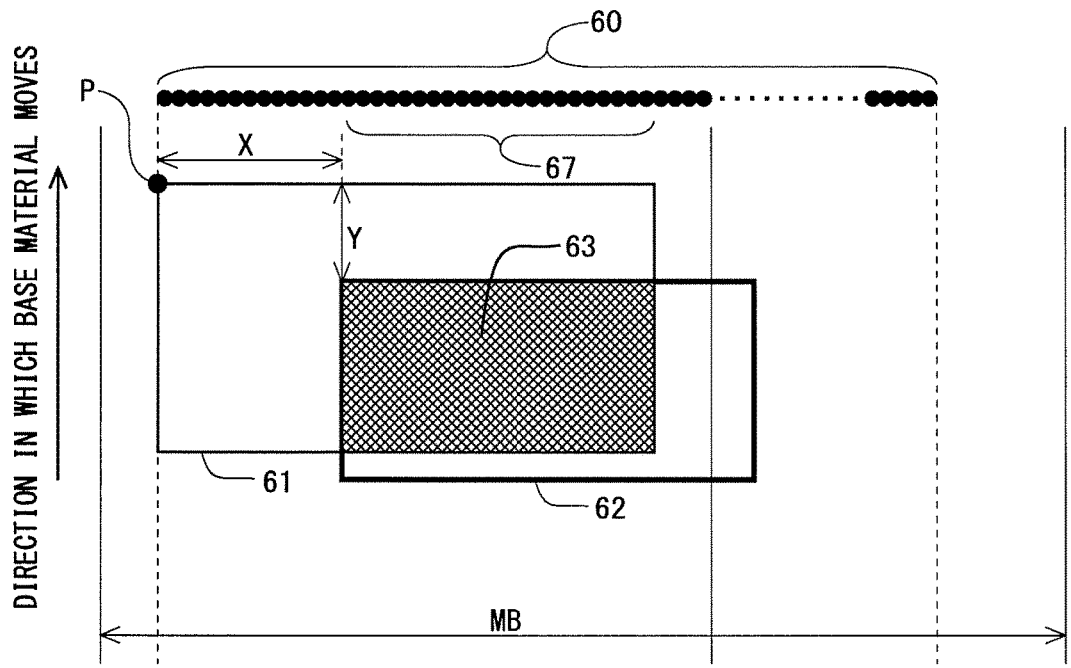
FIG. 13 is a diagram for describing determination of a print range and nozzles to be used for a case in which an offset is provided in the embodiment.

Finally, a print range and nozzles to be used are determined (step S340). By this step S340, a nozzle-to-be-used determining step is implemented. Here, a print range and nozzles to be used will be described with reference to FIGS. 12 and 13. Note that in FIGS. 12 and 13, an image range based on TIFF data is represented by a rectangular area indicated by reference sign 62, and a print range is represented by a shaded area indicated by reference sign 63. The print range varies depending on whether there is an offset. When an offset is not provided (when the value of the offset included in job information DJ is 0), with the upper left coordinates of the image range 62 based on the TIFF data being aligned with the reference position P, a range included in the effective print area 61, out of the image range 62, serves as the print range 63, as shown in FIG. 12. Then, nozzles 64 provided in the print range 63 serve as nozzles to be used. In the example shown in FIG. 12, the print range 63 coincides with the image range 62 based on the TIFF data. When an offset is provided (when the value of the offset included in job information DJ is other than 0), with the upper left coordinates of the image range 62 based on the TIFF data being displaced from the reference position P based on the value of the offset, a range included in the effective print area 61, out of the image range 62, serves as the print range 63, as shown in FIG. 13. As such, the print range 63 is determined based on the job information DJ, and nozzles 67 provided in the print range 63 serve as nozzles to be used. In the example shown in FIG. 13, a part of the image range 62 based on the TIFF data serves as the print range 63. After determining the print range and the nozzles to be used in the above-described manner, processing proceeds to an image data correction process (step S40 of FIG. 5).

<3.2.2. Image Data Correction Process>

Figure 14:
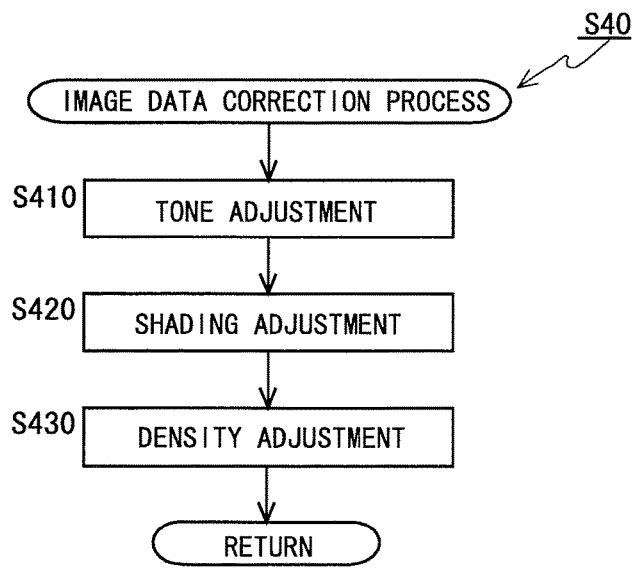
FIG. 14 is a flowchart showing a detailed procedure of an image data correction process in the embodiment.
Figure 15:
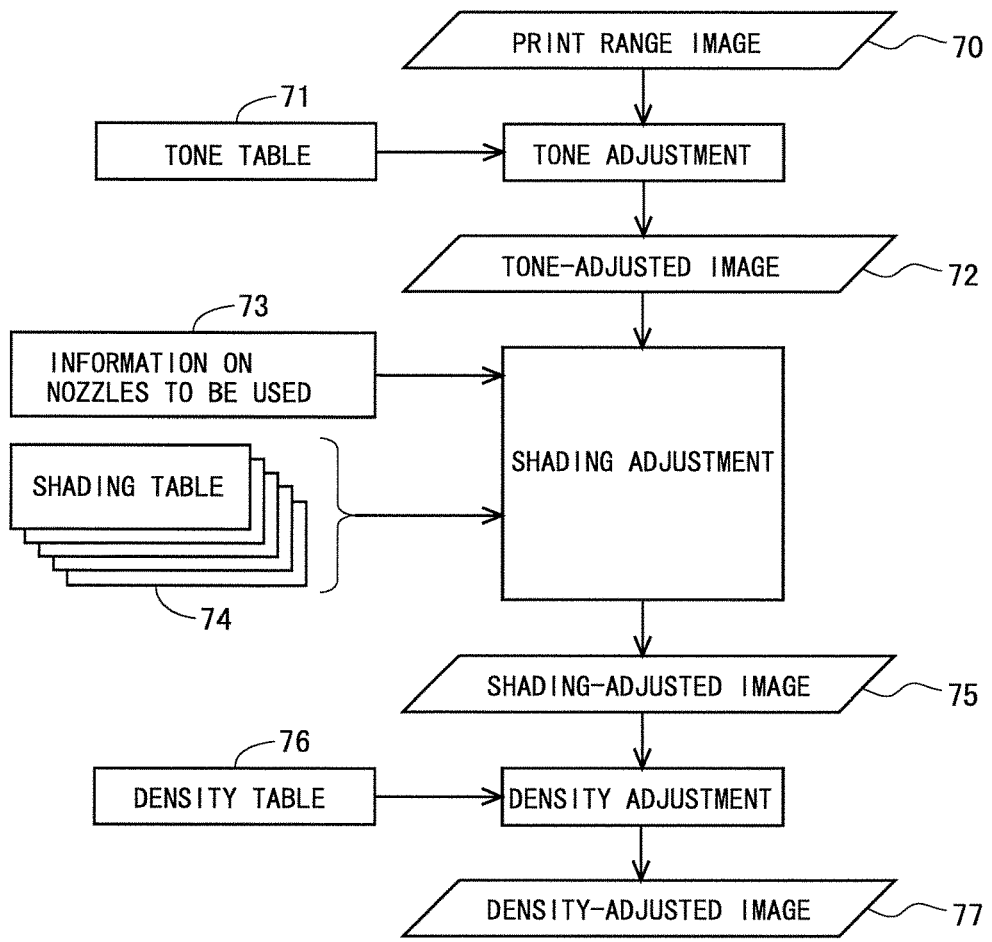
FIG. 15 is a diagram schematically showing the flow of an image data correction process in the embodiment.
Figure 16:
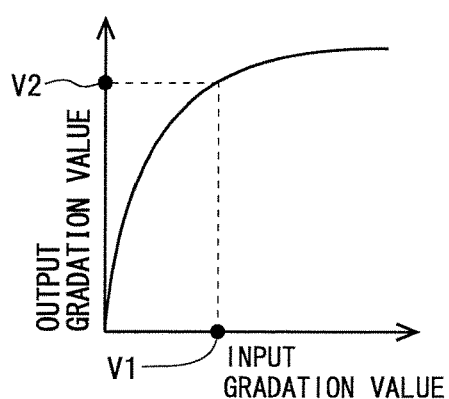
FIG. 16 is a diagram for describing tone adjustment in the embodiment.

The image data correction process will be described. Note that here description is made focusing on one color. FIG. 14 is a flowchart showing a detailed procedure of the image data correction process. In addition, FIG. 15 is a diagram schematically showing the flow of the image data correction process. After the image data correction process starts, first, tone adjustment is performed (step S410). At step S410, correction based on a tone table 71 which is obtained at step S20 (see FIG. 5) is performed on the gradation value of each pixel included in a print range image (an image within the print range 63 determined at the above-described step S340) 70. For example, in a case in which a tone table represented as shown in FIG. 16 is obtained, when the input gradation value of a given pixel (a gradation value based on the print range image 70) is V1, the output gradation value of the pixel is V2 by tone adjustment. By performing such tone adjustment on all pixels included in the print range image 70, a tone-adjusted image 72 is outputted.

After the tone adjustment, shading adjustment is performed (step S420). At step S420, correction based on a plurality of shading tables 74 included in the table set which is obtained at step S20 (see FIG. 5) is performed on the gradation value of each pixel included in the tone-adjusted image 72, taking into account information 73 on the nozzles to be used which are determined at step S340 (see FIG. 10). That is, the gradation value of each pixel included in the tone-adjusted image 72 is corrected based on the shading table corresponding to the nozzle to be used. By performing shading adjustment on all pixels included in the tone-adjusted image 72, a shading-adjusted image 75 is outputted.

After the shading adjustment, density adjustment is performed (step S430). At step S430, correction based on a density table 76 which is obtained at step S20 (see FIG. 5) is performed on the gradation value of each pixel included in the shading-adjusted image 75. By performing density adjustment on all pixels included in the shading-adjusted image 75, a density-adjusted image 77 is outputted. After the density adjustment, processing proceeds to an amount-of-ink-consumed calculation process (step S50 of FIG. 5).

Note that in the present embodiment a tone adjusting step is implemented by the above-described step S410, a shading adjusting step is implemented by the above-described step S420, and a density adjusting step is implemented by the above-described step S430.

Figure 17:
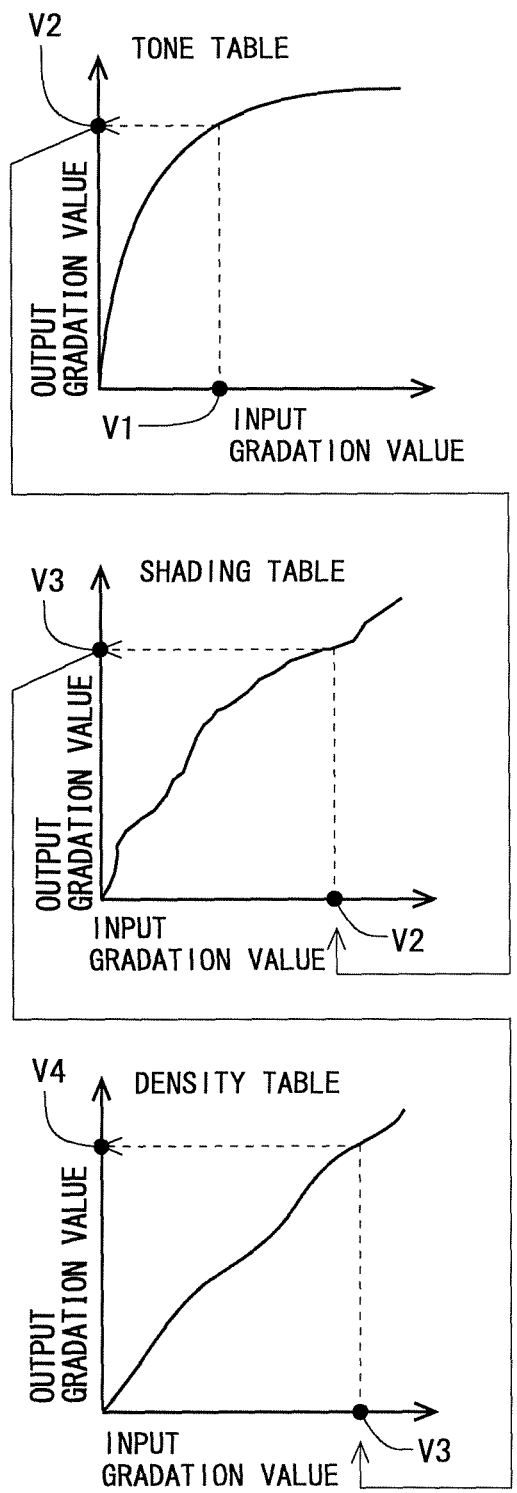
FIG. 17 is a diagram for describing correction of a gradation value by the image data correction process in the embodiment.

Meanwhile, in the image data correction process, an output gradation value which is obtained by tone adjustment using a tone table serves as an input gradation value which is used upon shading adjustment using a shading table, and an output gradation value which is obtained by the shading adjustment using the shading table serves as an input gradation value which is used upon density adjustment using a density table. Therefore, in a case in which a tone table, a shading table, and a density table represented as shown in FIG. 17 are used, when the gradation value of a given pixel included in the print range image 70 (see FIG. 15) is V1, the gradation value of the pixel after density adjustment is V4, as can be grasped from FIG. 17. Note that although in the present embodiment a tone table, a shading table, and a density table are provided separately, one type of table into which the tone table, shading table, and density table are merged may be provided.

<3.2.3 Amount-of-Ink-Consumed Calculation Process>

Figure 18:
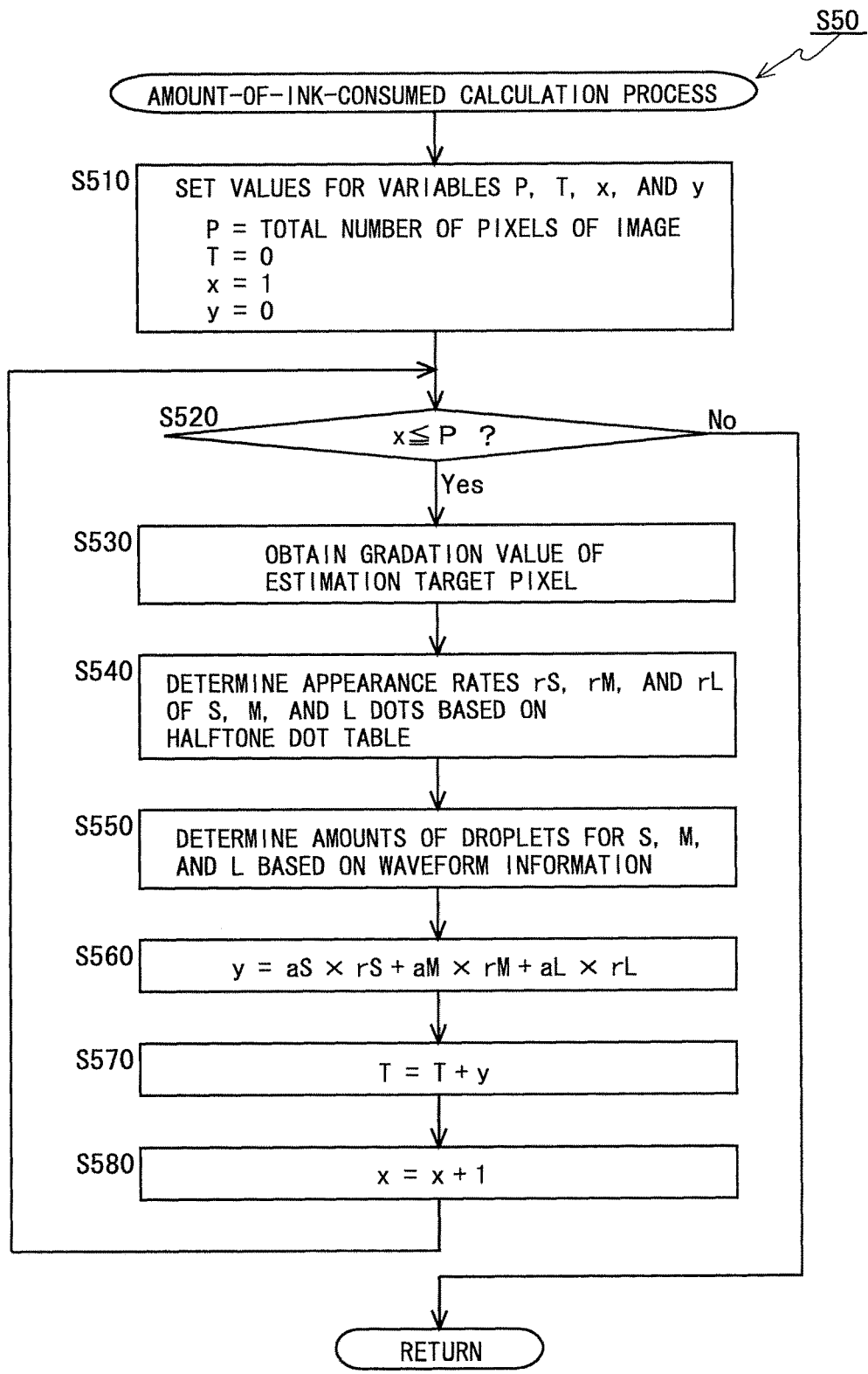
FIG. 18 is a flowchart showing a detailed procedure of an amount-of-ink-consumed calculation process in the embodiment.

FIG. 18 is a flowchart showing a detailed procedure of the amount-of-ink-consumed calculation process. In the amount-of-ink-consumed calculation process, the amount of ink required to print an image represented by the image data D2 which is corrected by the image data correction process (the density-adjusted image at the above-described step S430) is calculated. That is, in the amount-of-ink-consumed calculation process, the density-adjusted image is used.

First, values are set for variables P, T, x, and y which are used in the amount-of-ink-consumed calculation process (step S510). The variable P represents a total number of pixels in the estimation range. The variable T represents a cumulative value of the amount of ink estimated. The variable x represents an index of a pixel which is an estimation target in the process. When the estimation range includes K pixels, the variable x takes a value from 1 to K. The variable y represents the amount of ink estimated for the pixel which is an estimation target in the process. At step S510, the variable P is set to the value of the total number of pixels of the density-adjusted image, the variable T is set to "0", the variable x is set to "1", and the variable y is set to "0".

Then, it is determined whether the value of the variable x is less than or equal to the value of the variable P (step S520). If, as a result of the determination, the value of the variable x is less than or equal to the variable P, then processing proceeds to step S530. On the other hand, if the value of the variable x is greater than the variable P, then the amount-of-ink-consumed calculation process ends.

At step S530, the gradation value of a pixel (estimation target pixel) assigned the index which is represented by the variable x is obtained from the density-adjusted image. Then, an appearance rate of each dot size (an appearance rate rS of size S, an appearance rate rM of size M, and an appearance rate rS of size L) corresponding to the gradation value of the estimation target pixel is determined based on the halftone dot table obtained at step S20 (see FIG. 5) (step S540). Then, the amount of droplets for each dot size (the amount of droplets aS for size S, the amount of droplets aM for size M, and the amount of droplets aL for size L) is determined based on the waveform information (information on the waveform of a voltage provided to a piezoelectric element depending on an aimed amount of ink droplets) obtained at step S20 (step S550).

Thereafter, an amount of ink estimated y for the estimation target pixel is calculated by the following equation (1) (step S560):

$$y = aS \times rS + aM \times rM + aL \times rL \tag{1}$$

Thereafter, the value of the variable y calculated at step S560 is added to the value of the variable T (step S570). In addition, "1" is added to the value of the variable x (step S580). Thereafter, processing returns to step S520.

In the above-described manner, the processes at step S530 to S580 are repeated a number of times equal to the total number of pixels in the estimation range. Then, when the value of the variable x is greater than the value of the variable P (the value equal to the total number of pixels in the estimation range), the amount-of-ink-consumed calculation process ends. The value of the variable T obtained at that time is the amount of ink per copy for a corresponding color. A value obtained by multiplying that amount of ink by the number of copies in the job information DJ is the amount of ink consumed which is an output result of the amount-of-ink-consumed calculation process. In this manner, the amount of ink consumed is calculated for each color.

<3.2.4 Flushing Estimation Process>

Figure 19:
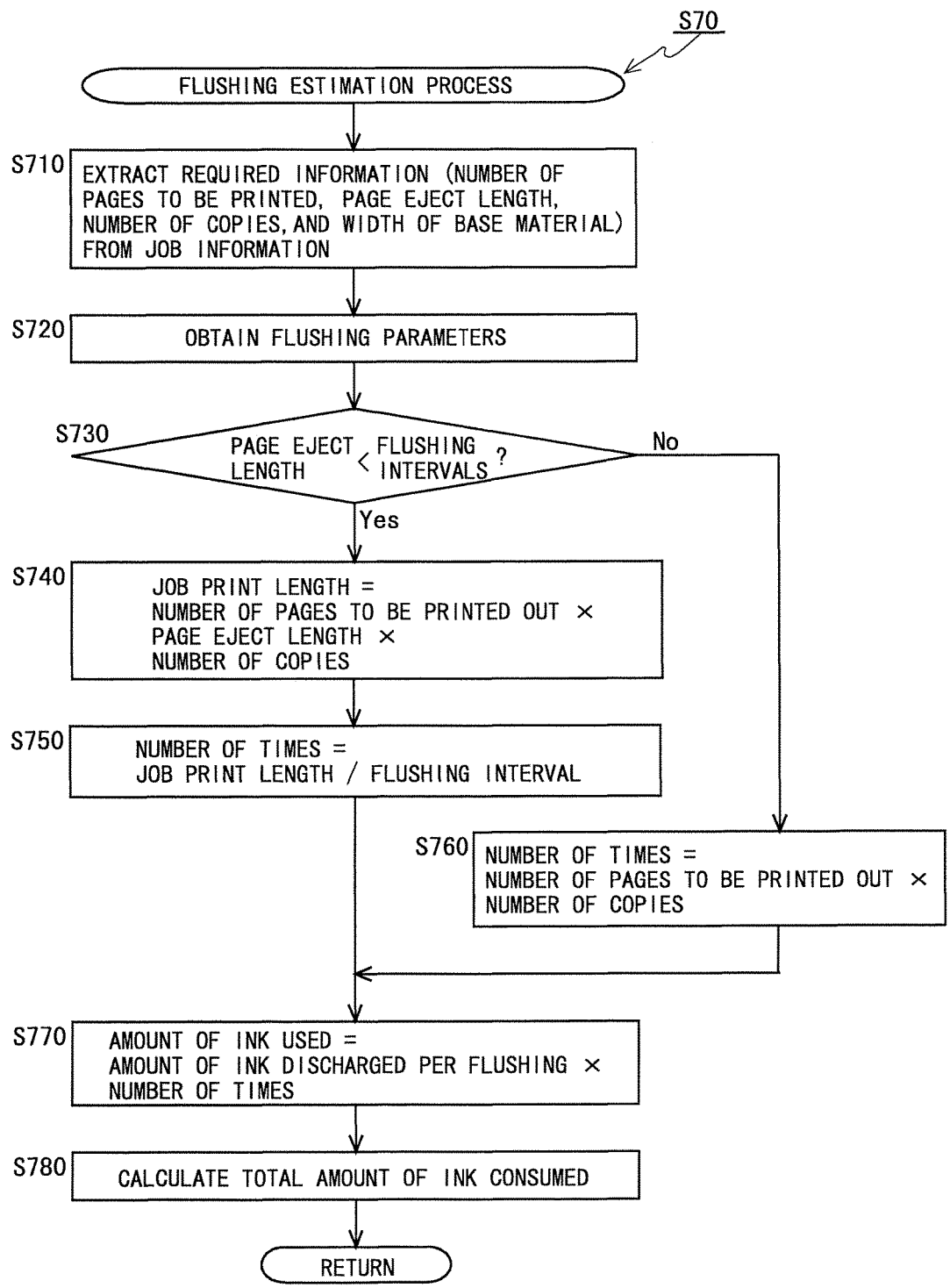
FIG. 19 is a flowchart showing a detailed procedure of a flushing estimation process in the embodiment.

FIG. 19 is a flowchart showing a detailed procedure of the flushing estimation process. The flushing estimation process is performed for each color. Note, however, that a flushing estimation process is performed only for a color (ink color) for which flushing is performed. For example, in an apparatus that performs flushing only for a white ink, a flushing estimation process is performed only for white. In addition, the procedure described below is an example and thus an actual procedure may be determined according to the specifications of flushing performed by each apparatus.

After the flushing estimation process starts, first, information required for the flushing estimation process is extracted from the job information DJ obtained at step S10 (see FIG. 5) (step S710). In the present embodiment, the information on the number of pages to be printed, page eject length, the number of copies, and the width of a base material is extracted from the job information DJ. Note that the number of pages to be printed is determined from the information on a print page range. Then, flushing parameters are obtained (step S720). In the present embodiment, a flushing interval and the amount of ink discharged per flushing are obtained as the flushing parameters. The flushing interval is set to, for example, 2 m. In addition, in one flushing, for example, ink of an amount corresponding to eight lines is discharged using a dot of size L, and the amount of ink required for that process is the above-described amount of ink discharged per flushing.

Then, it is determined whether the page eject length is less than the flushing interval (step S730). If, as a result of the determination, the page eject length is less than the flushing interval, then processing proceeds to step S740. On the other hand, if the page eject length is greater than or equal to the flushing interval, then processing proceeds to step S760.

At step S740, a job print length is calculated. The job print length is calculated by multiplying the number of pages to be printed out, the page eject length, and the number of copies together. Thereafter, the number of times (the number of times flushing is performed) is calculated (step S750). The number of times is calculated by dividing the job print length by the flushing interval. After step S750 ends, processing proceeds to step S770.

At step S760, too, the number of times is calculated. Note, however, that at step S760, unlike step S750, the number of times is calculated by multiplying the number of pages to be printed out by the number of copies. After step S760 ends, processing proceeds to step S770.

At step S770, the amount of ink used by flushing is calculated. The amount of ink used is calculated by multiplying the amount of ink discharged per flushing by the number of times (the number of times calculated at step S750 or S760). Finally, a total amount of ink consumed is calculated (step S780). The total amount of ink consumed is obtained by adding the amount of ink consumed which is calculated at step S50 (amount-of-ink-consumed calculation process) to the amount of ink used which is calculated at step S770. After step S780 ends, processing proceeds to the above-described step S80 (see FIG. 5).

<4. Effects>

According to the present embodiment, adjustment data DA which is data for adjusting, for each inkjet printing apparatus used for printing, the amount of ink discharged when printing is performed is obtained according to job information DJ included in a print job, and image data D1 to be printed is corrected using the adjustment data DA. By this, the image data D1 to be printed is corrected in the same manner as when printing is actually performed. Then, based on corrected image data D2, the amount of ink required for printing is estimated. As such, the amount of ink consumed is estimated taking into account the adjustment data DA. Therefore, the amount of ink consumed when the inkjet printing apparatus performs printing is estimated with higher accuracy than conventional cases.

In addition, when the amount of ink consumed upon the execution of a print job that is supposed to perform flushing is estimated, the amount of ink used for flushing is also calculated. Then, a total of the amount of ink used for printing of an image and the amount of ink used for flushing is calculated as a total amount of ink actually consumed. As such, since the amount of ink consumed by flushing is also taken into account, the amount of ink consumed is estimated with sufficiently high accuracy.

As a result of an improvement in the accuracy of estimation of the amount of ink consumed as described above, the occurrence of a waste of ink, a base material, etc., due to the ink running out in the middle of printing is suppressed. In addition, cost required for printing can be pre-estimated with sufficiently high accuracy.

Note that although, in the above-described embodiment, tone adjustment data for adjusting the tone of each color, shading adjustment data for adjusting the amount of ink discharged from each nozzle of the inkjet printing apparatus, and density adjustment data for adjusting the density of each color are used as color adjustment data, data other than those can also be used. For example, when a drive voltage for a nozzle head is adjusted, data thereof may be used. In addition, depending on the settings of an inkjet printing apparatus, the inkjet printing apparatus may be set to use only some of those data. For example, the inkjet printing apparatus may be set to perform printing using only tone adjustment data for adjustment. In this case, the inkjet printing apparatus operates to perform printing without performing adjustment itself for shading adjustment data and density adjustment data. The expression "without performing adjustment itself" used here refers to that the same operation as adjustment is performed using each adjustment data as an initial value, i.e., a linear table. Then, as for estimation of the amount of ink consumed for a case of this setting, the same estimation operation as that described above is performed such that under the same conditions as those for a case of performing the above-described printing operation and with shading adjustment data and density adjustment data used as initial values, adjustment is performed using the initial values. Alternatively, without adjusting all of tone adjustment data, shading adjustment data, and density adjustment data, printing may be performed by performing the same operation as adjustment using initial values. By this, the amount of ink consumed can be estimated under the same conditions as those of the settings of the inkjet printing apparatus, improving the accuracy of estimation of the amount of ink consumed.

<5. Variant>

A variant of the above-described embodiment will be described. Even when printing is performed using the same image data, the amount of ink consumed changes depending on the settings (printing speed, etc.) of a job or adjustment data DA. Therefore, when the settings of a job or adjustment data DA is (are) changed after performing estimation of the amount of ink consumed, unless estimation of the amount of ink consumed is performed again, the amount of ink consumed by actual printing cannot be grasped correctly. However, in the above-described embodiment, it is premised that an amount-of-ink-consumed estimation process is performed by an instruction from an operator (user). Therefore, when job information DJ or adjustment data DA is changed, in order to correctly grasp a predicted amount of ink consumed, the operator needs to perform an operation again so that the print control apparatus 310 performs an amount-of-ink-consumed estimation process again. In view of this, in the present variant, the print control apparatus 310 is configured such that, when job information DJ or adjustment data DA is changed, an amount-of-ink-consumed estimation process is automatically performed again without through an operation by the operator.

Figure 20:
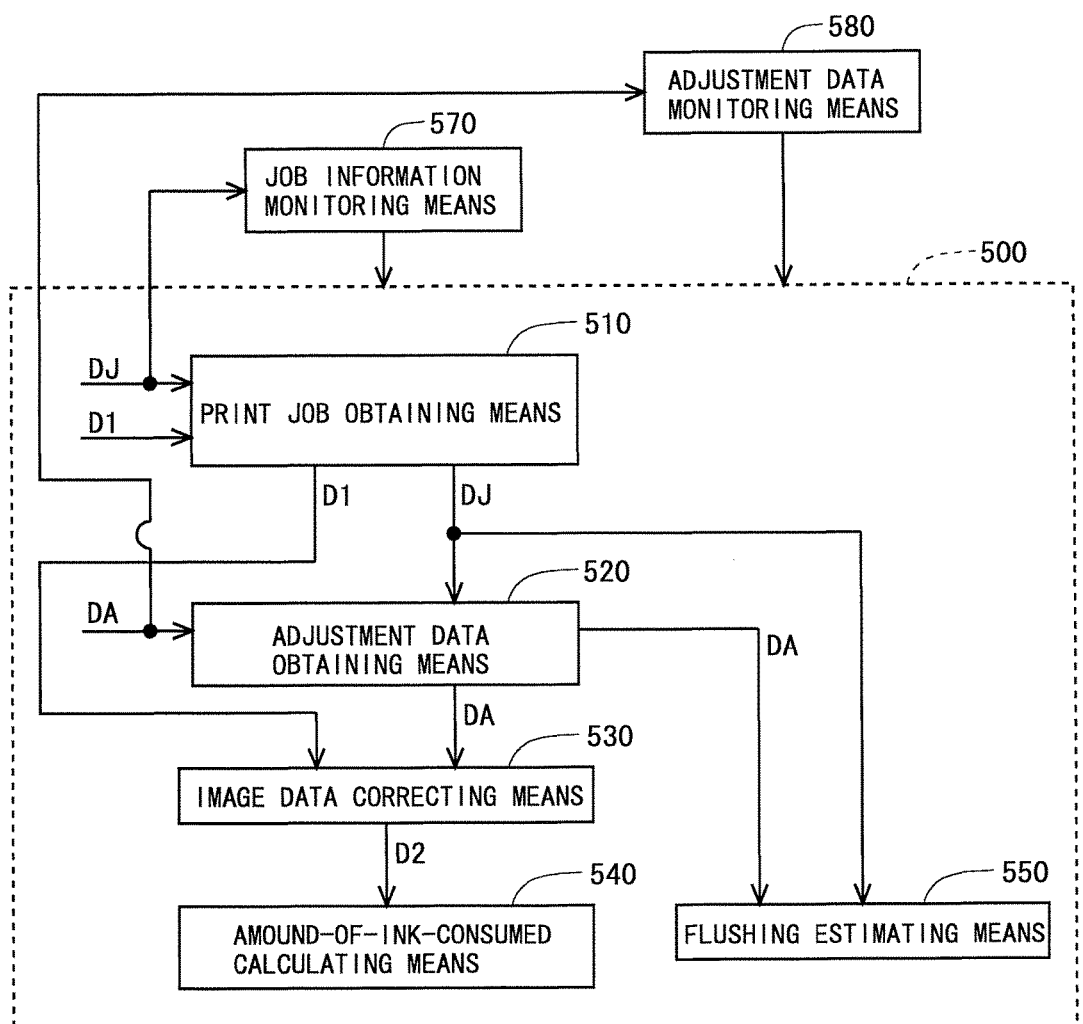
FIG. 20 is a functional block diagram showing the configuration of functions implemented by a print control apparatus in a variant of the embodiment.

FIG. 20 is a functional block diagram showing the configuration of functions implemented by the print control apparatus 310 in the present variant. The print control apparatus 310 in the present variant is provided with, as functional components, job information monitoring means 570 and adjustment data monitoring means 580 in addition to the components in the above-described embodiment (see FIG. 4).

The job information monitoring means 570 monitors job information DJ included in a print job. When the content of the job information DJ is changed, the job information monitoring means 570 provides a command instructing to estimate the amount of ink consumed, using the changed job information DJ, to an amount-of-ink-consumed estimating unit 500 including print job obtaining means 510, adjustment data obtaining means 520, image data correcting means 530, amount-of-ink-consumed calculating means 540, and flushing estimating means 550. By this, the above-described amount-of-ink-consumed estimation process is performed again from step S20 (see FIG. 5). At this time, when the flushing flag is on, the amount of ink consumed is calculated by the adjustment data obtaining means 520, the image data correcting means 530, the amount-of-ink-consumed calculating means 540, and the flushing estimating means 550, and when the flushing flag is off, the amount of ink consumed is calculated by the adjustment data obtaining means 520, the image data correcting means 530, and the amount-of-ink-consumed calculating means 540. As such, when a change in the content of job information DJ is detected by the job information monitoring means 570, the amount of ink consumed based on the changed job information DJ is estimated without through an operation by the operator.

The adjustment data monitoring means 580 monitors whether adjustment data DA is changed. Then, when the adjustment data DA is changed, the adjustment data monitoring means 580 provides a command instructing to estimate the amount of ink consumed, using the changed adjustment data DA, to the above-described amount-of-ink-consumed estimating unit 500. Since the adjustment data DA does not affect an estimation range determination process, the above-described amount-of-ink-consumed estimation process is performed again from step S40 (see FIG. 5). At this time, when the flushing flag is on, the amount of ink consumed is calculated by the image data correcting means 530, the amount-of-ink-consumed calculating means 540, and the flushing estimating means 550, and when the flushing flag is off, the amount of ink consumed is calculated by the image data correcting means 530 and the amount-of-ink-consumed calculating means 540. As such, when a change in adjustment data DA is detected by the adjustment data monitoring means 580, the amount of ink consumed based on the changed adjustment data DA is estimated without through an operation by the operator.

As described above, according to the present variant, when job information DJ or adjustment data DA is changed, an amount-of-ink-consumed estimation process is automatically performed again. Hence, the user can always accurately grasp the amount of ink consumed by printing (estimation value) without caring about a change in job information DJ or adjustment data DA.

<6. Others>

In the above-described embodiment (including the variant), an amount-of-ink-consumed estimation process is performed by the print control apparatus 310 included in the inkjet printing apparatus 300, but the present invention is not limited thereto. The present invention can also be applied to a case in which an amount-of-ink-consumed estimation process is performed by an apparatus independently of the inkjet printing apparatus 300.

Although the present invention has been described in detail above, the above description is to be considered in all respects as illustrative and not restrictive. It will be understood that many other changes and modifications may be made without departing from the sprit and scope of the present invention.

Note that this application claims priority to Japanese Patent Application No. 2016-147200 titled "Method of Estimating Amount of Ink Consumed, Apparatus for Estimating Amount of Ink Consumed, and Printing System" filed Jul. 27, 2016, the content of which is incorporated herein by reference.

What is claimed is:

1. A method of estimating an amount of ink consumed when an inkjet printing apparatus performs printing, the method comprising:
   a print job obtaining step of obtaining a print job including image data to be printed and job information, the job information being attribute information about printing;
   an adjustment data obtaining step of obtaining adjustment data corresponding to the job information included in the print job from among a plurality of pieces of adjustment data, the plurality of pieces of adjustment data being for adjusting, for each inkjet printing apparatus used for printing, an amount of ink discharged when printing is performed and the plurality of pieces of adjustment data being prepared in advance so as to correspond to job information;

an image data correcting step of correcting the image data using the adjustment data; and an amount-of-ink-consumed calculating step of calculating, as an amount of ink consumed, an amount of ink required to print an image represented by the image data corrected by the image data correcting step.

2. The method of estimating an amount of ink consumed according to claim 1, wherein in the adjustment data obtaining step, tone adjustment data, shading adjustment data, and density adjustment data are obtained as the adjustment data, the tone adjustment data being for adjusting a tone of each color, the shading adjustment data being for adjusting an amount of ink discharged from each nozzle of the inkjet printing apparatus, and the density adjustment data being for adjusting a density of each color, and in the image data correcting step, the image data is corrected using the tone adjustment data, the shading adjustment data, and the density adjustment data.

3. The method of estimating an amount of ink consumed according to claim 2, wherein the tone adjustment data is a tone table in which an input gradation value and an output gradation value are associated with each other to adjust a tone, the shading adjustment data is a shading table in which an input gradation value and an output gradation value are associated with each other to adjust an amount of ink discharged, the density adjustment data is a density table in which an input gradation value and an output gradation value are associated with each other to adjust a density, and in the adjustment data obtaining step, a tone table appropriate to the job information is obtained for each color from among a plurality of tone tables prepared, a shading table appropriate to the job information is obtained for each color and each nozzle to be used upon printing from among a plurality of shading tables prepared, and a density table appropriate to the job information is obtained for each color from among a plurality of density tables prepared.

4. The method of estimating an amount of ink consumed according to claim 3, wherein the image data correcting step includes:

a tone adjusting step of correcting a gradation value of each pixel included in the image data, based on the tone table obtained in the adjustment data obtaining step;

a shading adjusting step of correcting the gradation value of each pixel corrected by the tone adjusting step, based on the shading table obtained in the adjustment data obtaining step; and a density adjusting step of correcting the gradation value of each pixel corrected by the shading adjusting step, based on the density tables obtained in the adjustment data obtaining step.

5. The method of estimating an amount of ink consumed according to claim 4, further comprising a nozzle-to-be-used determining step of determining nozzles provided in a print range as nozzles to be used, the print range being determined based on the job information, wherein in the shading adjusting step, the gradation value of each pixel is corrected based on shading table for the respective nozzles to be used, the nozzles to be used being determined in the nozzle-to-be-used determining step.

6. The method of estimating an amount of ink consumed according to claim 1, wherein in the adjustment data obtaining step, an amount-of-droplet adjustment data is obtained as the adjustment data, the amount-of-droplet adjustment data being for adjusting an amount of ink droplets discharged from a nozzle of the inkjet printing apparatus that is used for printing, and in the amount-of-ink-consumed calculating step, the amount of ink consumed is calculated using the amount-of-droplet adjustment data.

7. The method of estimating an amount of ink consumed according to claim 6, wherein in the amount-of-ink-consumed calculating step, an amount of ink consumed for each pixel when focusing on one color is calculated by obtaining a sum total of products of an appearance rate of each droplet size depending on a gradation value of the pixel and an amount of droplets corresponding to the droplet size, using a halftone dot table in which an appearance rate of each of a plurality of droplet sizes when ink is discharged from a nozzle of the inkjet printing apparatus that is used for printing is set for each gradation value.

8. The method of estimating an amount of ink consumed according to claim 7, wherein the amount-of-droplet adjustment data is the halftone dot table, in the adjustment data obtaining step, a halftone dot table appropriate to the job information is obtained for each color from among a plurality of halftone dot tables prepared, and in the amount-of-ink-consumed calculating step, the appearance rate of each droplet size depending on a gradation value of the pixel is determined using the halftone dot table obtained in the adjustment data obtaining step.

9. The method of estimating an amount of ink consumed according to claim 7, wherein the amount-of-droplet adjustment data is waveform information of a voltage provided to a piezoelectric element in the inkjet printing apparatus that is used for printing depending on an aimed amount of ink droplets, and in the amount-of-ink-consumed calculating step, the amount of droplets for each of the plurality of droplet sizes is determined based on the waveform information.

10. The method of estimating an amount of ink consumed according to claim 1, further comprising:

a flushing determining step of determining, based on flushing enable/disable data, whether to perform flushing when printing based on the image data is performed; and a flushing estimating step of calculating an amount of ink used by flushing, when it is determined in the flushing determining step that flushing is performed, wherein in the adjustment data obtaining step, the flushing enable/disable data is obtained as the adjustment data, and in the flushing estimating step, a total amount of ink consumed when printing is performed is calculated by adding the amount of ink used calculated in the flushing estimating step to the amount of ink consumed calculated in the amount-of-ink-consumed calculating step.

11. An apparatus for estimating an amount of ink consumed when an inkjet printing apparatus performs printing, the apparatus comprising:
a print job obtaining unit configured to obtain a print job including image data to be printed and job information, the job information being attribute information about printing;
an adjustment data obtaining unit configured to obtain adjustment data corresponding to the job information included in the print job from among a plurality of pieces of adjustment data, the plurality of pieces of adjustment data being for adjusting, for each inkjet printing apparatus used for printing, an amount of ink discharged when printing is performed and the plurality of pieces of adjustment data being prepared in advance so as to correspond to job information;
an image data correcting unit configured to correct the image data using the adjustment data; and
an amount-of-ink-consumed calculating unit configured to calculate, as an amount of ink consumed, an amount of ink required to print an image represented by the image data corrected by the image data correcting unit.

12. The apparatus for estimating an amount of ink consumed according to claim 11, further comprising a job information monitoring unit configured to monitor the job information included in the print job, wherein
when a change in the job information is detected by the job information monitoring unit, an amount of ink consumed based on the changed job information is calculated by the adjustment data obtaining unit, the image data correcting unit, and the amount-of-ink-consumed calculating unit without an operation by an operator.

13. The apparatus for estimating an amount of ink consumed according to claim 11, further comprising an adjustment data monitoring unit configured to monitor whether the adjustment data is changed, wherein
when a change in the adjustment data is detected by the adjustment data monitoring unit, an amount of ink consumed based on the changed adjustment data is calculated by the image data correcting unit and the amount-of-ink-consumed calculating unit without an operation by an operator.

14. A printing system including an image data generating apparatus that generates image data to be printed; and an inkjet printing apparatus including a printer main body that performs printing by discharging ink on to a base material, and a print control apparatus that controls operation of the printer main body, the printing system comprising:
a print job obtaining unit configured to obtain a print job including the image data and job information, the job information being attribute information about printing;
an adjustment data obtaining unit configured to obtain adjustment data corresponding to the job information included in the print job from among a plurality of pieces of adjustment data generated by the inkjet printing apparatus to adjust an amount of ink discharged when printing is performed, the plurality of pieces of adjustment data being generated so as to correspond to job information;
an image data correcting unit configured to correct the image data using the adjustment data obtained by the adjustment data obtaining unit; and
an amount-of-ink-consumed calculating unit configured to calculate, as an amount of ink consumed, an amount of ink required to print an image represented by the image data corrected by the image data correcting unit.

15. The printing system according to claim 14, further comprising a job information monitoring unit configured to monitor the job information included in the print job, wherein
when a change in the job information is detected by the job information monitoring unit, an amount of ink consumed based on the changed job information is calculated by the adjustment data obtaining unit, the image data correcting unit, and the amount-of-ink-consumed calculating unit without an operation by an operator.

16. The printing system according to claim 14, further comprising an adjustment data monitoring unit configured to monitor whether the adjustment data is changed, wherein
when a change in the adjustment data is detected by the adjustment data monitoring unit, an amount of ink consumed based on the changed adjustment data is calculated by the image data correcting unit and the amount-of-ink-consumed calculating unit without an operation by an operator.

17. The method of estimating an amount of ink consumed according to claim 1, wherein
the image data correcting step includes a step in which input gradation values are adjusted to be output gradation values, and
the adjustment data includes a data that defines correspondences between the input gradation values and the output gradation values.

18. The apparatus for estimating an amount of ink consumed according to claim 11, wherein
the apparatus is configured to adjust input gradation values to be output gradation values, and
the adjustment data includes a data that defines correspondences between the input gradation values and the output gradation values.

19. The method of estimating an amount of ink consumed according to claim 1, wherein
the job information includes information on a type of base material and a printing mode.

20. The apparatus for estimating an amount of ink consumed according to claim 11, wherein
the job information includes information on a type of base material and a printing mode.

* * * * *